US010860262B2

(12) United States Patent
Ishii

(10) Patent No.: US 10,860,262 B2
(45) Date of Patent: Dec. 8, 2020

(54) PRINTING APPARATUS

(71) Applicant: BROTHER KOGYO KABUSHIKI KAISHA, Nagoya (JP)

(72) Inventor: Hidekazu Ishii, Inazawa (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 16/575,332

(22) Filed: Sep. 18, 2019

(65) Prior Publication Data

US 2020/0097222 A1    Mar. 26, 2020

(30) Foreign Application Priority Data

Sep. 21, 2018 (JP) ................. 2018-178112

(51) Int. Cl.
*G06F 3/12* (2006.01)

(52) U.S. Cl.
CPC .......... *G06F 3/1204* (2013.01); *G06F 3/1243* (2013.01); *G06F 3/1257* (2013.01); *G06F 3/1258* (2013.01)

(58) Field of Classification Search
CPC ............................ G06F 3/1204; G06F 3/1243
See application file for complete search history.

(56) References Cited

U.S. PATENT DOCUMENTS

| 7,315,613 B2 * | 1/2008 | Kleindienst ....... H04M 1/72547 |
| | | 379/88.01 |
| 2013/0243509 A1 * | 9/2013 | Ishii ....................... B41F 17/02 |
| | | 400/76 |

FOREIGN PATENT DOCUMENTS

| JP | 2004-216795 A | 8/2004 |
| JP | 2010-173127 A | 8/2010 |
| JP | 2011-148140 A | 8/2011 |

* cited by examiner

*Primary Examiner* — Ibrahim Siddo

(74) *Attorney, Agent, or Firm* — Kenealy Vaidya LLP

(57) ABSTRACT

A printing apparatus includes: a conveyor; a printing device; a first storage storing templates, in each of which objects are arranged on a printing medium; a voice input device; an output device; and a controller. The controller is configured to: accept designation of a particular template by voice; make an inquiry about a content of at least one particular character to be assigned to each of the objects in the particular template; accept the content of the at least one particular character to be assigned to each of the objects in response to the inquiry, by voice; and create print data for each of the objects based on character data created by character recognition of the voice indicating the accepted content and control the conveyor and the printing device to perform printing on the printing medium based on the created print data.

14 Claims, 9 Drawing Sheets

PRINTING APPARATUS

CROSS REFERENCE TO RELATED APPLICATION

The present application claims priority from Japanese Patent Application No. 2018-178112, which was filed on Sep. 21, 2018, the disclosure of which is herein incorporated by reference in its entirety.

BACKGROUND

The following disclosure relates to a printing apparatus and particularly to a printing apparatus having a template printing function.

There are conventionally known techniques in which an internal memory (hereinafter referred to as "template memory") of a printing apparatus stores a plurality of types of templates each as template-printing information for performing predetermined template printing in accordance with a manner of printing of a printed label, and the printing apparatus calls and uses a necessary template in response to an operation of a user on an operation terminal such as a personal computer and a tablet computer.

The operation terminal is installed in advance with a predetermined application including driver information for causing the printing apparatus to perform printing. For example, the template is transferred from the printing apparatus to the operation terminal using an editor displayed on a screen of the operation terminal, and thereafter print data (hereinafter may be referred to as "print command") containing template data is transferred from the operation terminal to the printing apparatus to cause the printing apparatus to perform printing.

Specifically, in order to perform printing using the template, the user operates the operation terminal to designate a template number (e.g., No. 12) corresponding to a desired template. In response, the operation terminal reads the desired template (e.g., the name-list template) from the printing apparatus. The user then designates a text name of an object (hereinafter referred to as "Text 1") for insertion of a name to be input to the name-list template, then inputs a name (e.g., "Neill"), and then operates the operation terminal to cause the operation terminal to transmit an end command to the printing apparatus.

The user further designates other information to be input to the name-list template. For example, the user designates a text name of an object (hereinafter referred to as "Text 2") for insertion of a birth date, then inputs a birth date (e.g., "1970/1/1"), and then operates the operation terminal to cause the operation terminal to transmit the end command to the printing apparatus.

When the transmission of the end command is finished for each information, the user operates the operation terminal to transmit a printing start command to the printing apparatus to instruct the printing apparatus to start printing.

SUMMARY

In this printing apparatus, however, the operation terminal calls a necessary template and transmits the print command for printing. It is difficult for the user to use the operation terminal for printing when compared with a case where data relating to a plurality of types of templates are contained in advance in an application installed in the operation terminal.

Accordingly, an aspect of the disclosure relates to a printing apparatus capable of reducing burden on a user and improving convenience to the user while omitting complicated operations of the user as possible.

In one aspect of the disclosure, a printing apparatus includes: a conveyor configured to convey a printing medium; a printing device configured to perform printing on the printing medium conveyed by the conveyor; a first storage configured to store (i) a first template in which a first objet is disposed at a first position on the printing medium, and a second objet is disposed at a second position on the printing medium, and (ii) a second template in which the first objet is disposed at a third position on the printing medium, and the second objet is disposed at a fourth position on the printing medium; a voice input device configured to input a voice; an output device configured to output information; and a controller configured to execute: a designation accepting processing in which the controller accepts designation of a particular template, which is one of the first template and the second template, by voice via the voice input device; a content-inquiry processing in which the controller makes an inquiry via the output device about contents of at least one first particular character to be assigned to the first object and at least one second particular character to be assigned to the second object contained in the particular template for which the designation is accepted; a content accepting processing in which the controller accepts the contents of the assigned at least one first particular character and the assigned at least one second particular character in response to the inquiry, by voice via the voice input device; and a printed-material creating processing in which the controller creates print data for the first object and the second object respectively based on first character data and second character data created by character recognition of the voice indicating the accepted contents of the at least one first particular character and the at least one second particular character and controls the conveyor and the printing device to perform printing on the printing medium based on the created print data to create a printed material.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

EMBODIMENT

Figure 1:
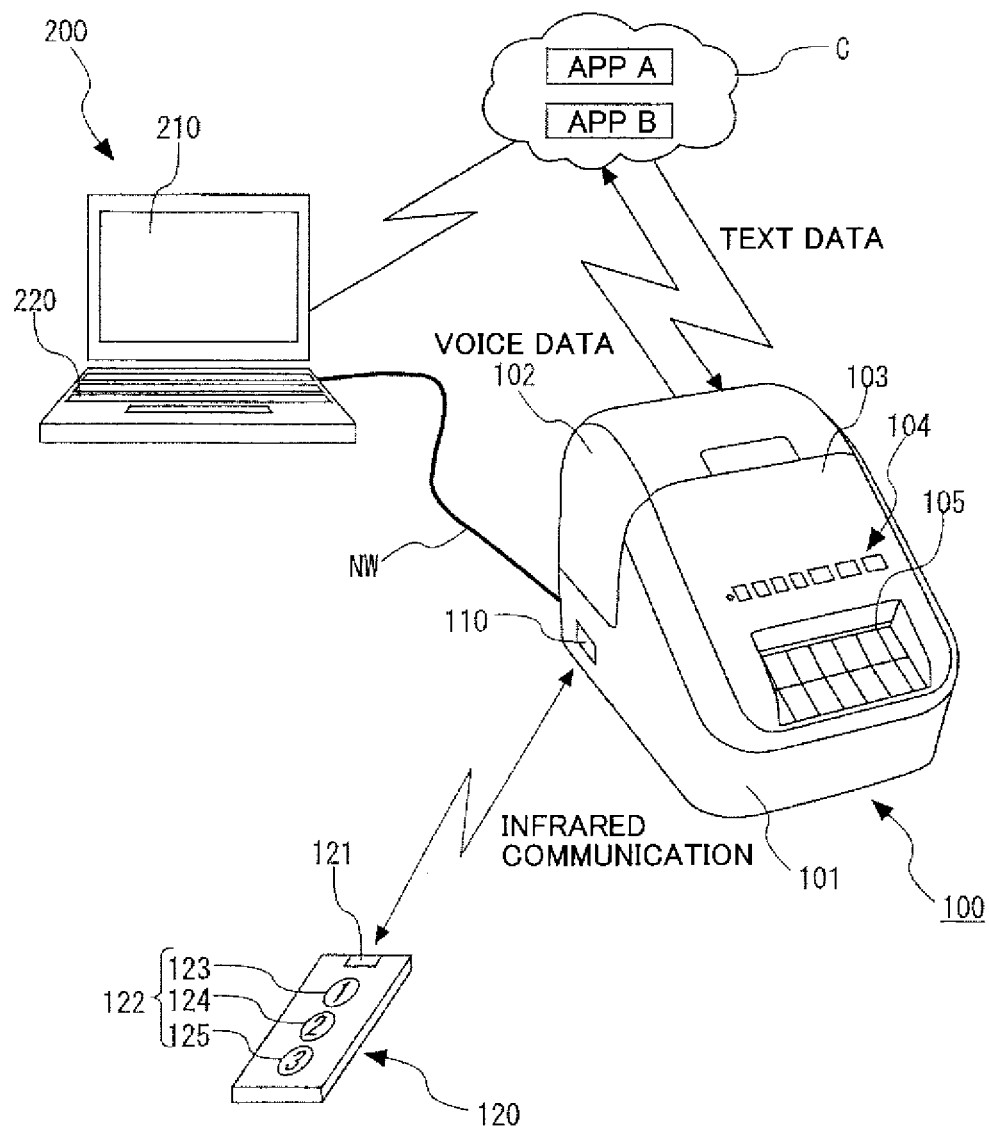
FIG. 1 is a diagram of a label creating system including a printing apparatus according to one embodiment.

Hereinafter, there will be described one embodiment by reference to the drawings. It is to be understood that the elements illustrated in the drawings are scaled as needed for easy understanding.

As illustrated in FIG. 1, a printing apparatus 100 is connected to a personal computer (PC) 200 as an operation terminal via a wired or wireless communication line or network NW in the form of a printer cable in FIG. 1.

The PC 200 includes a display 210 and an operation interface 220. One example of the display 210 is a liquid crystal display. Examples of the operation interface 220 include a keyboard and a mouse. The PC 200, for example, is capable of using an application such as an editor to edit the contents of printing that is to be performed by the printing apparatus 100 to create a printed label. As long as the operation terminal has a computer function and a function of mutual communication with the printing apparatus 100, the operation terminal may be any device such as a laptop computer as illustrated in FIG. 1, a desktop computer, a tablet computer, and a smartphone. The PC 200 is capable of downloading applications available on a cloud C over an electrical communication network such as the Internet. One example of the applications is a driver for using the printing apparatus 100.

The printing apparatus 100 is operable by remote control. A side surface of the printing apparatus 100 is provided with an infrared receiver 110 as a communication device. This infrared receiver 110 receives an infrared signal transmitted from a remote controller 120 operated by the user. This configuration enables the printing apparatus 100 to operate in accordance with the infrared signal (such as a printing-start command signal) received from the remote controller 120 by the infrared receiver 110. It is noted that the printing-start command signal may be transmitted from the remote controller 120 over short-distance wireless communication using a radio wave instead of the infrared communication and received by the printing apparatus 100 using its antenna as a communication device. Thus, the remote controller 120 may be a device capable of performing short-distance wireless communication using Bluetooth (registered trademark) with the printing apparatus 100, for example.

The remote controller 120 is provided with a transmission window 121 for transmitting an infrared signal, and a plurality of operation buttons 122. In this example, the operation buttons 122 include: a first operation button 123 for selecting a first operation; a second operation button 124 for selecting a second operation; and a third operation button 125 for selecting a third operation. In the present embodiment, the type of a template, which will be described below, relating to a print manner of the printed label is selectable by operating one of the operation buttons 122 selectively.

That is, the user selects a template to be used from among a plurality of prepared templates by selectively pressing one of the first operation button 123, the second operation button 124, and the third operation button 125. The remote controller 120 sends the printing apparatus 100 an infrared signal related to the operation button 122 operated by the user. It is noted that the number of the operation buttons 122 is not limited to three. For example, well-known numeric keypad and/or other operation buttons may be used in accordance with the types and the number of the templates prepared in advance. Ones of the first operation button 123, the second operation button 124, and the third operation button 125 may be used in combination.

For example, in the case where two or more of the operation buttons 122 are used in combination, the user selects "1", "2", or "3" for each of the ten's place and the one's place. Thus, one example of the template has three large groups as the ten's place and three small groups as the one's place.

Specifically, the templates 11-13 are associated with birth dates (the small group) of the name list (the large group), the templates 21-23 with e-mail addresses (the small group) of the name list (the large group), and the templates 31-33 with names (the small group) of the post (the large group), for example.

Figure 2A:
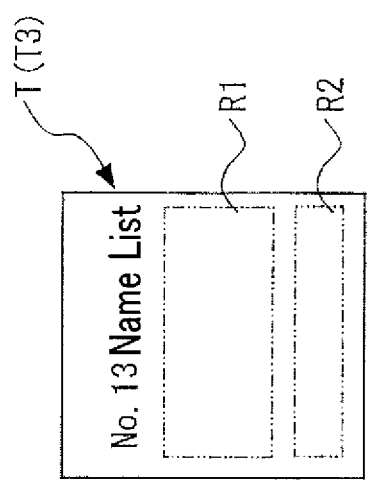
FIGS. 2A through 2C are views each for explaining a relationship between one example of a template stored in the printing apparatus according to the one embodiment and a printed label using the template.
Figure 2A:
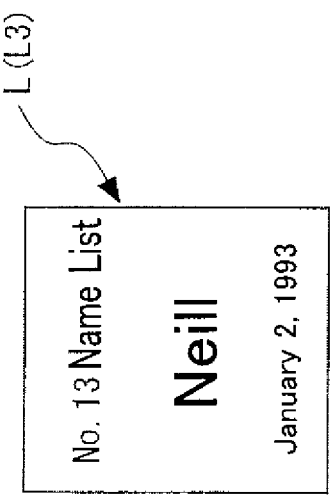
Figure 2B:
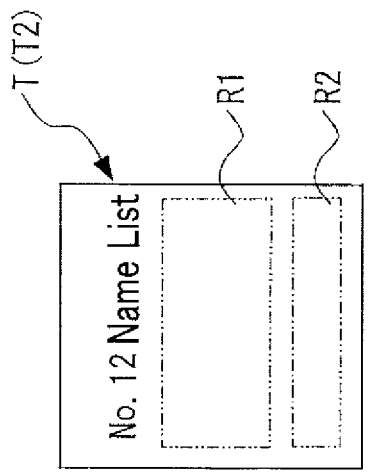
Figure 2B:
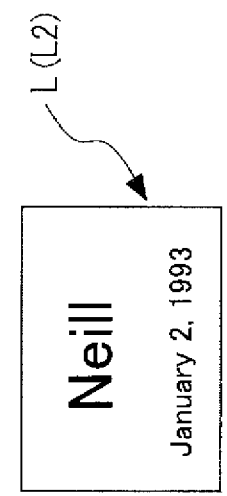
Figure 2C:
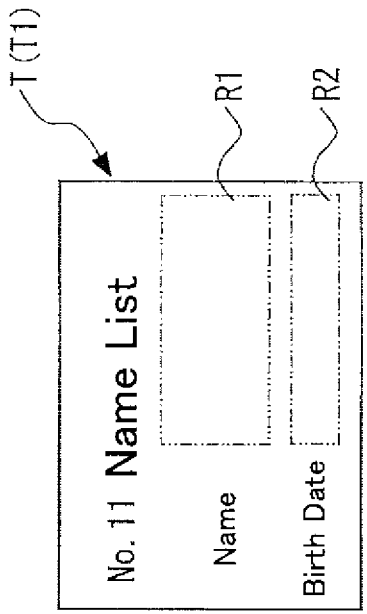
Figure 2C:
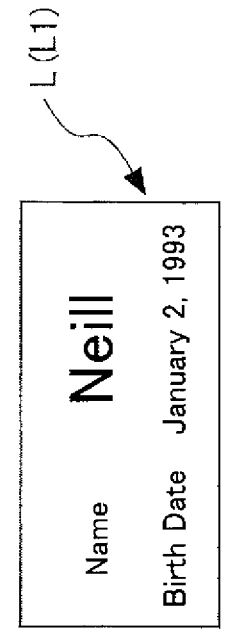

FIGS. 2A-2C respectively represent examples of templates T and printed labels L created using the respective templates T. In template printing which will be described below, for example, in the case of the templates T1-T3 assigned respectively with 11-13 illustrated in FIGS. 2A-2C, two objects R1, R2 are provided on each of the templates T1-T3 containing "Name List" as the large group, for example.

The object R1 is a border for insertion of the name and named "Text 1", for example. The object R2 is a border for insertion of the birth date and named "Text 2", for example. It is assumed that the templates T are transmitted from the PC 200 to the printing apparatus 100 in advance. While each of the borders is a frame defining an imaginary region on the template T for printing a text on the printed label L, an actual ornamental border may be printed on the printed label L. Thus, ornamental conditions such as the font and the size of the text may be included in each of the objects R1, R2, for example.

On the template T1 illustrated in FIG. 2A and associated with the template number 11, the texts "Name" and "Birth Date" are fixed, and the name (family name) and the birth date are insertable respectively into the objects R1, R2. The fixed texts "Name" and "Birth Date", the name "Neill", and the birth date "Jan. 2, 1993" are printed on a printed label L1 corresponding to the template T1.

On the template T2 illustrated in FIG. 2B and associated with the template number 12, the name (family name) and the birth date are insertable respectively into the objects R1, R2. The name "Neill" and the birth date "Jan. 2, 1993" are printed on a printed label L2 corresponding to the template T2.

On the template T3 illustrated in FIG. 2C and associated with the template number 13, the assigned number "No. 13" and the text "Name List" are fixed, and the name (family name) and the birth date are insertable respectively into the objects R1, R2. The assigned number "No. 13", the title "Name List", the name "Neill", and the birth date "Jan. 2, 1993" are printed on a printed label L3 corresponding to the template T3.

As illustrated in FIG. 1, the printing apparatus 100 includes: a body housing 101 formed of resin; a rear cover 102 formed of resin and attached openably so as to cover an upper rear portion of the body housing 101; and a front cover 103 formed of resin and attached openably so as to cover an upper front portion of the body housing 101. The front cover 103 is provided with: a key input interface 104 including a main power switch that turns a power source on and off; and an output opening 105 through which the printed label is discharged to the outside.

Figure 3:
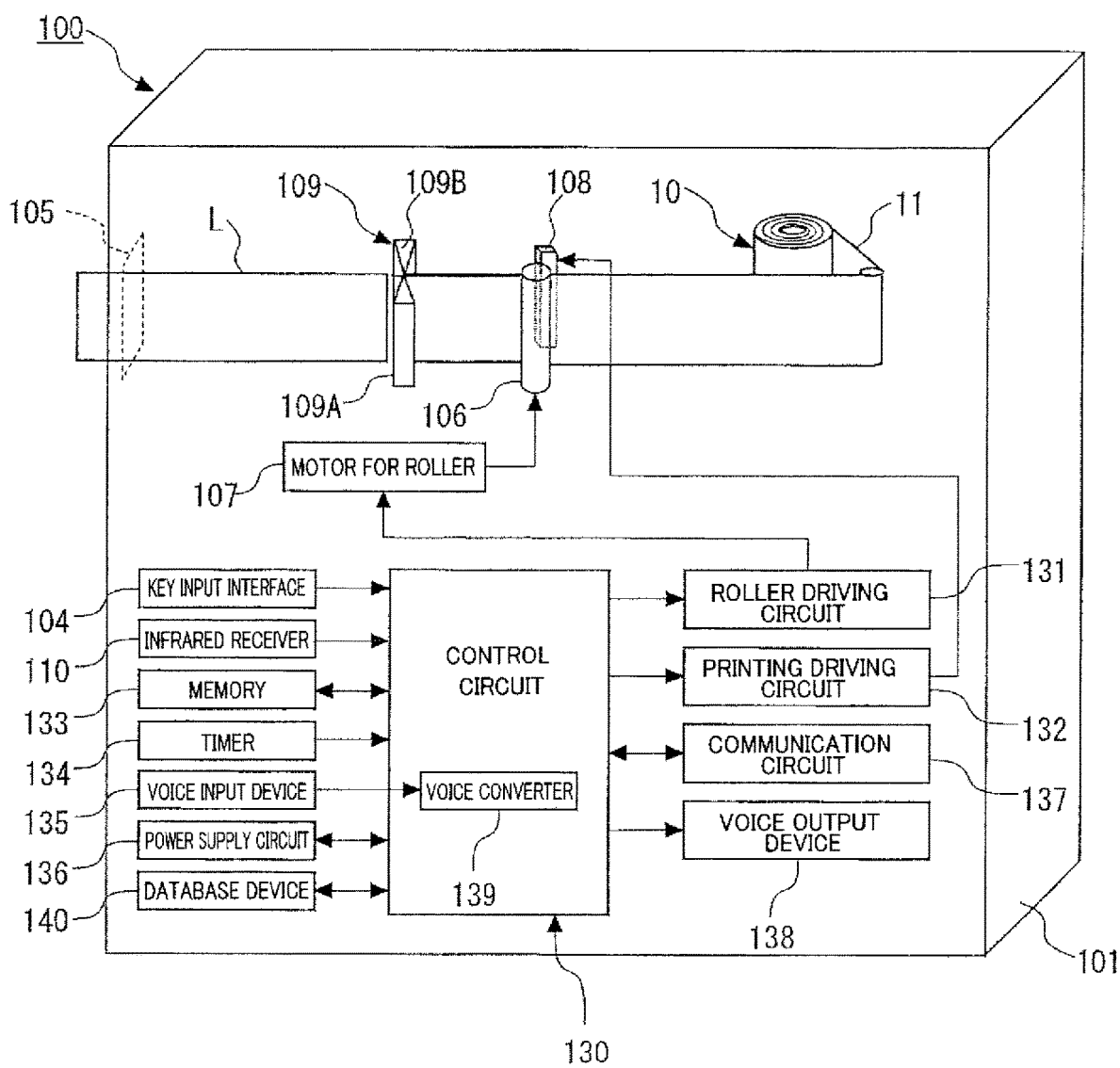
FIG. 3 is a conceptual view representing a control system of the printing apparatus.

There will be next described the internal configuration of the printing apparatus 100 with reference to FIG. 3. In FIG. 3, the body housing 101 contains a roll (tape roll) 10 of a tape 11 having a predetermined width. The tape roll 10 has a tight spiral shape related to the thickness of the tape 11 in reality but is simplified in FIG. 2. The tape 11 is constituted by (i) an elongated heat-sensitive sheet (what is called a thermal paper sheet) that develops color when heated and (ii) a separating sheet bonded to one of opposite surfaces of the heat-sensitive sheet with adhesive. The tape roll 10, for example, is contained in a cartridge. The body housing 101 includes a cartridge holder, not illustrated, that removably holds the cartridge.

A platen-roller motor 107 drives a platen roller 106 as one example of a conveyor to draw and convey the tape 11 from the tape roll 10. The platen-roller motor 107 is controlled by a platen-roller driving circuit 131 via a control circuit 130. The conveyed tape 11 is guided to the output opening 105 via a space formed between the platen roller 106 and a thermal head 108 as one example of a printing device.

The thermal head 108 includes a multiplicity of heating elements, not illustrated, arranged in a direction orthogonal to a tape conveying direction in which the tape 11 is conveyed. The platen roller 106 is opposed to a surface of the thermal head 108 on which the heating elements are provided. The heating elements are controlled and energized by a printing driving circuit 132 based on dot-pattern data used for printing to print characters on a surface of the tape 11 drawn from the tape roll 10. The characters include letters (text), signs, marks, and so on. In the following description, the characters may be collectively referred to as "text". In the present embodiment, examples of the marks include simple marks, such as a star, a circle, a triangle, and a rectangle, which may be managed and read using mark numbers assigned in a table form in advance.

A cutter unit 109 is disposed in the output opening 105. The cutter unit 109 includes a fixed blade 109B and a movable blade 109A. The tape 11 printed by the thermal head 108 is cut by the movable blade 109A reciprocated at a predetermined timing by an actuator, not illustrated, such as a motor for cutting and a solenoid. The tape 11 is cut so as to form the printed label L having a predetermined length which is discharged from the output opening 105.

Instead of an automatic cutting operation using a driving force of the actuator, the user may manually reciprocate the movable blade 109A to cut the tape 11. Alternatively, the printing apparatus 100 may be configured such that an indicating lamp, not illustrated, such as a light-emitting diode (LED) indicates that the conveyed tape 11 has reached a predetermined cutting position, and the user having viewed the indication operates a cutting button of the key input interface 104 to cause the actuator to move the movable blade 109A to cut the tape 11.

Though not illustrated, a rear portion of the body housing 101 is provided with (i) an inlet to which a power code, not illustrated, connected to a commercial power source is connected and (ii) a plurality of USB connectors each including the communication line NW according to the USB (Universal Serial Bus) standard. Using the USB connectors enables connection between the printing apparatus 100 and the PC 200 via the communication line NW.

The control circuit 130 functions as a microcomputer and includes a central processing unit (CPU), a read-only memory (ROM), and a random-access memory (RAM) though not illustrated. The control circuit 130 executes various processings including printing according to programs (including applications) stored in the ROM in advance while using a temporary storage function of the RAM.

In the present embodiment, in addition to the key input interface 104 and the infrared receiver 110, devices serving as input or input/output devices connected to the control circuit 130 include: a template memory 133 different from the RAM and the ROM and storing data corresponding to the templates T; a timer 134 configured to measure the current time; a voice input device 135 such as a microphone; and a power supply circuit 136 configured to control electricity supplied from the power code. In addition to the platen-roller driving circuit 131 and the printing driving circuit 132, devices serving as output or input/output devices connected to the control circuit 130 include: a communication circuit 137 configured to control connection to the Internet network, for example; and a voice output device 138 such as a speaker. The control circuit 130 includes: a voice converter 139 configured to analyze a voice input from the voice input device 135 and convert the voice to voice data; and a database device 140 including a large-capacity storage medium such as a hard disc drive (HDD).

The template memory 133 may also serve as the database device 140, and vice versa. The database device 140 stores a database DB (see the middle portion of FIG. 4) in a table form, for example. The database DB is constituted by text data associated with various kinds of information including characters that are to be inserted into the objects R1, R2 of the template T when creating the printed label L.

Thus, the database device 140 stores the database DB including a plurality of records (corresponding to horizontal lines and rows) each associated with characters and corresponding to a plurality of fields (corresponding to vertical lines and columns). The template memory 133 stores the templates T (e.g., T1-T3) including the objects R1, R2 which correspond to the respective fields and to each of which the characters associated with a corresponding one of the fields (the columns) are assigned in each of the records (corresponding to the rows) of the database DB stored in the database device 140. That is, the objects R1, R2 of each of the templates T (e.g., T1-T3) are associated with the respective fields of the database DB (corresponding to the vertical lines and the columns). It is noted that each of the records is associated with a unique management number.

The ROM of the control circuit 130 stores print data (dot patterns) associated with code data and constituted by characters to be printed. The control circuit 130 uses the print data stored in the ROM to create print data for performing printing on predetermined regions of the printed label L (regions corresponding to the type of the template which will be described below). Based on the created print data, the control circuit 130 controls the printing driving circuit 132 to control the platen roller 106 to draw the tape 11 and control the thermal head 108 to perform printing to create the printed label L.

It is noted that the control circuit 130 receives electricity from the power supply circuit 136 connected to the power code and is connected to the communication line NW and the cloud C via the communication circuit 137. This configuration enables the control circuit 130 to transfer information with the PC 200 connected to the communication line NW and with a route server, another terminal, a general-purpose computer, and an information server connected to the cloud C, for example.

Figure 4:
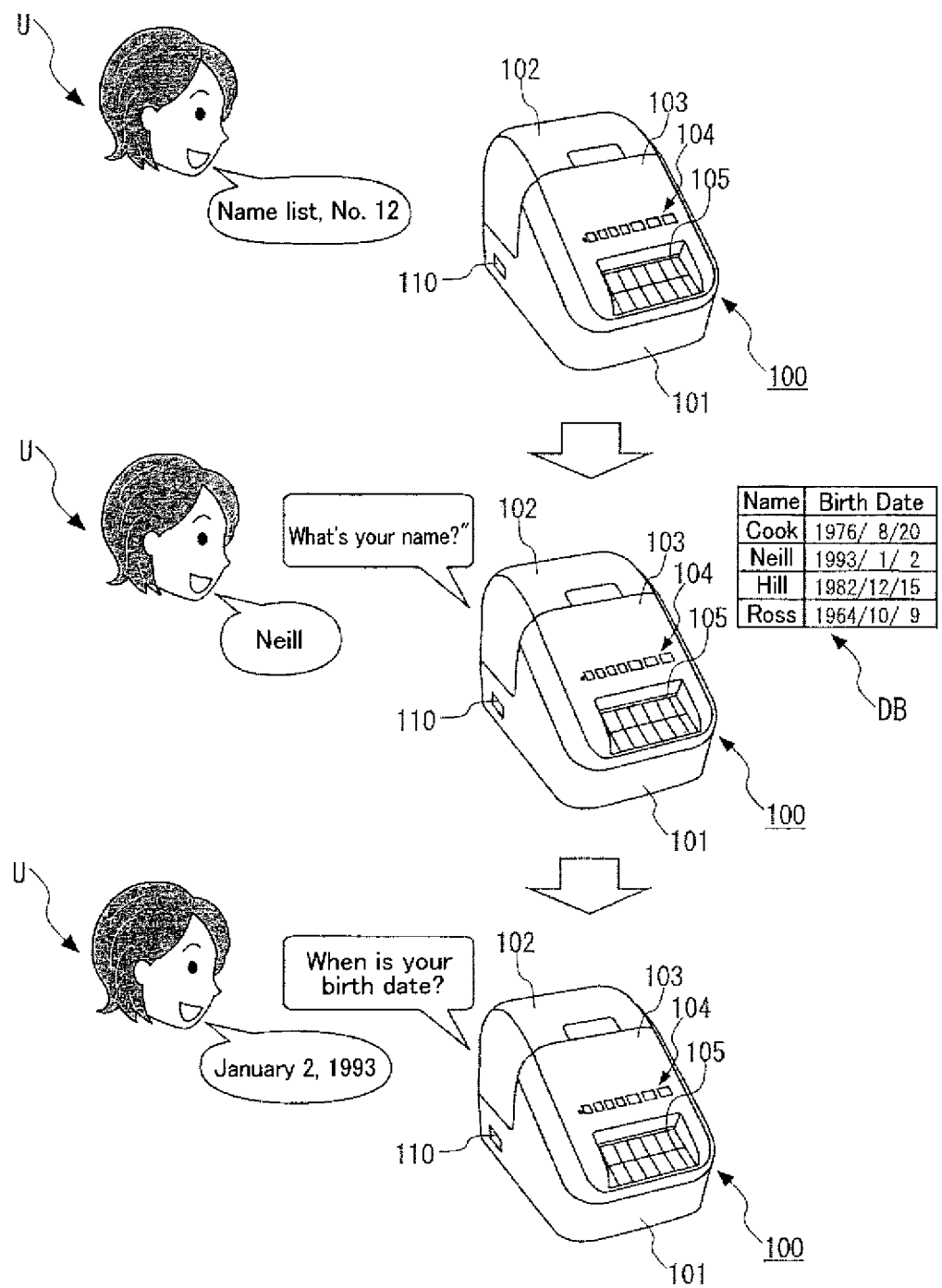
FIG. 4 is a view for conceptually explaining one example of operations sequentially performed by the printing apparatus and a user.

As illustrated in FIG. 4, the printing apparatus 100 is capable of determining the type of the template T by a voice of a user U and performing printing. The template T is assigned with the objects R1, R2 at desired positions on an image corresponding to the printed label L. Each of the objects R1, R2 is a border into which the characters may be freely input. When creating the printed label L in reality, the arrangement of the objects R1, R2 are always fixed, and characters to be inserted into the objects R1, R2 are designated for each printing by the user U with his or her voice to create the printed label L.

For example, the user U makes a predetermined template calling voice (e.g., "Name list, No. 12") toward the printing apparatus 100 without using the remote controller 120. This voice is picked up by the voice input device 135 of the printing apparatus 100 and recognized by the control circuit 130 in a well-known voice-recognition method.

As a result, the printing apparatus 100 reads the template T2 assigned with No. 12 from among the templates T assigned with "Name List" and recognizes that the object R1 for insertion of the name and the object R2 for insertion of the birth date are assigned to the template T2 in advance.

As illustrated in the middle portion of FIG. 4, the printing apparatus 100 then controls the voice output device 138 to make a voice "What's your name?" in order to make an inquiry to the user U for determination of the name to be inserted into the object R1.

The user U answers "Neill", for example. This voice is also picked up by the voice input device 135 of the printing apparatus 100 and recognized by the control circuit 130 in a well-known voice-recognition method. After this answer, when the user U intentionally keeps silent for a particular length of time counted by the timer 134, the printing apparatus 100 completes accepting the name (family name) "Neill" to be inserted into the object R1 and determines the name. This configuration enables the user to input the name into the object R1 without the need of an input operation to the object R1 with, e.g., a keyboard and an operation of transmitting an input end command in an input finishing operation, for example.

As illustrated in the lower portion of FIG. 4, the printing apparatus 100 controls the voice output device 138 to make a voice "When is your birth date?" in order to make an inquiry to the user U for determination of the birth date to be inserted into the object R2.

The user U answers "Jan. 2, 1993", for example. This voice is also picked up by the voice input device 135 of the printing apparatus 100 and recognized by the control circuit 130 in a well-known voice-recognition method. After this answer, when the user U intentionally keeps silent for a particular length of time, the printing apparatus 100 completes accepting the birth date "Jan. 2, 1993" to be inserted into the object R2 and determines the birth date. This configuration enables the user to input the birth date into the object R2 without the need of an input operation to the object R2 with, e.g., a keyboard and an operation of transmitting an input end command in an input finishing operation, for example.

In conversion (character recognition) from the recognized voice to characters, the voice converter 139 of the control circuit 130 recognizes the voice and converts the voice to text data. Voice recognition may be performed using a voice-recognition application (e.g., an application A or B) on the cloud C as illustrated in FIG. 1 to obtain text data from the cloud C, for example.

When the user U keeps silent for a particular length of time after the contents of all the objects R1, R2 are determined as described above, the contents of all the objects are determined.

The printing apparatus 100 then inserts "Neill" into the object R1 as the text name "Text 1" and inserts "Jan. 2, 1970" into the object R2 as the text name "Text 2" to complete the template T2. It is noted that the birth date may be represented in a different manner, such as "1997/1/1". The printing apparatus 100 then creates print data corresponding to the completed template T2, specifically, the printing apparatus 100 creates a driving control signal for driving the heating elements of the thermal head 108. As a result, the printing apparatus 100 creates the printed label L as a printed material printed with "Neill, Jan. 2, 1993" as illustrated in the lower portion of FIG. 2B.

As described above, the printing apparatus 100 includes: the platen roller 106 that conveys the tape 11; the thermal head 108 that performs printing on the tape 11 conveyed by the platen roller 106; the template memory 133 that stores the templates T including the objects R1, R2 that are changeably assigned to desired positions; the voice input device 135 that inputs voice; the voice output device 138 that outputs voice; and the control circuit 130 that controls at least the platen roller 106, the thermal head 108, and the voice output device 138. The control circuit 130 of the printing apparatus 100 is configured to execute: a designation accepting processing for accepting designation of a particular template T by voice (e.g., "Name list, No. 12") via the voice input device 135 (noted that this processing corresponds to the upper portion of FIG. 4); a content-inquiry processing for making an inquiry (e.g., "What's your name?" and "When is your birth date?") by voice via the voice output device 138 about the contents of characters to be assigned to the plurality of objects R1, R2 of the particular template T for which the designation is accepted (noted that this processing corresponds to the middle and lower portions of FIG. 4); a content accepting processing for accepting, by voice via the voice input device 135, the contents of the characters ("Neill" and "Jan. 2, 1993") to be assigned in response to the inquiry; and a printed-material creating processing for controlling the platen roller 106 and the thermal head 108 to create a printed material by printing on the tape 11 based on print data in which text data or mark data (as one example of character data) created by character recognition of the voice of the accepted contents of the characters are assigned to the objects R1, R2.

Figure 5:
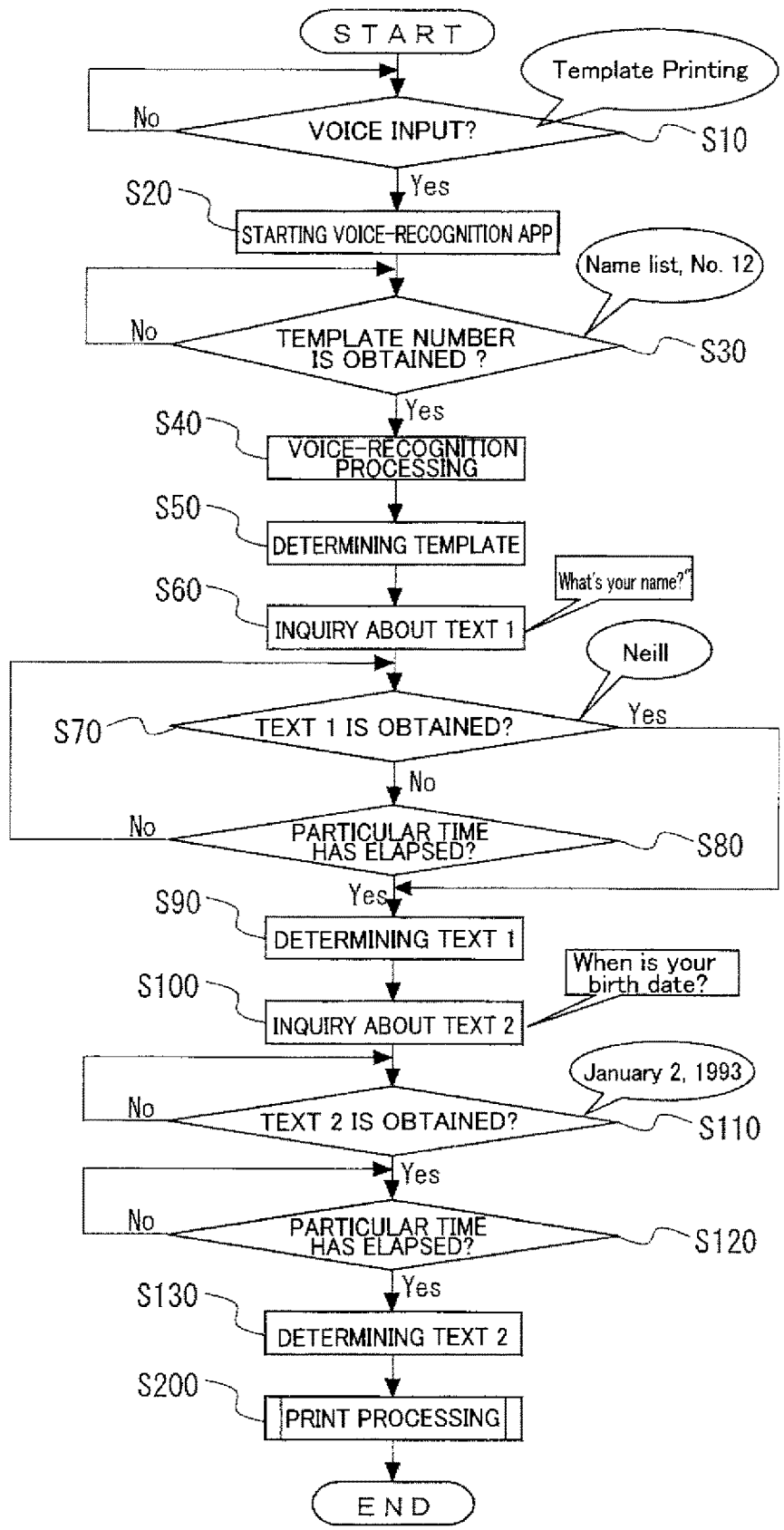
FIG. 5 is a flow representing a control procedure executed by a control circuit.

There will be next described, with reference to FIG. 5, a control procedure that is executed by the control circuit 130 of the printing apparatus 100 to execute the above-described processings. It is noted that the following procedure is executed assuming that the remote controller 120 is not used.

The flow illustrated in FIG. 5 begins when the main power switch of the key input interface 104 of the printing apparatus 100 is turned on, and a predetermined initializing processing is executed, or the printing apparatus 100 returns from an energy-saving mode, for example.

The control circuit 130 at S10 determines whether the printing apparatus 100 has accepted that the user U starts a mode in which the template T is called and used without using the remote controller 120. This mode may be hereinafter referred to as "template printing mode". For example, the control circuit 130 determines whether the user U has input a voice "Template Printing" into the voice input device 135 as wording for starting the mode. When the control circuit 130 determines that the user U has said the predetermined wording for starting the mode (S10: Yes), this flow goes to S20. When the control circuit 130 determines that the user U has not said the predetermined wording for starting the mode (S10: No), the control circuit 130 repeats this processing.

The control circuit 130 at S20 starts an application for executing the template printing mode not using the remote controller 120, and this flow goes to S30.

The control circuit 130 at S30 determines whether the user U has input a voice relating to the type of the template T and the template number into the voice input device 135 as wording for designating a desired template T. One example of the voice relating to the type of the template T and the template number is "Name list, No. 12". When the control circuit 130 determines that the user U has said the wording for designation (S30: Yes), this flow goes to S40. When the control circuit 130 determines that the user U has not said the wording for designation (S30: No), the control circuit 130 repeats this processing. Thus, the control circuit 130 at S30 executes the designation accepting processing for accepting designation of the particular template T by voice via the voice input device 135.

The control circuit 130 at S40 executes a voice-recognition processing for recognizing the voice "Name list, No. 12", picked up by the voice input device 135, in the well-known voice-recognition method using the voice converter 139, and this flow goes to S50.

The control circuit 130 at S50 determines and reads the template T2 assigned with No. 12 as one of the templates T assigned with "Name List" from among data relating to the templates T stored in the template memory 133, and this flow goes to S60.

The control circuit 130 at S60 controls the voice output device 138 to make a voice "What's your name?" as wording for inquiry about the text 1 to be inserted into the object R1 of the template T2, and this flow goes to S70. That is, the control circuit 130 at S60 executes the content-inquiry processing for making an inquiry by voice via the voice output device 138 about the contents of the characters to be assigned to the object R1 of the objects R1, R2 of the particular template T2 for which designation is accepted.

The control circuit 130 at S70 determines whether the voice input device 135 has obtained a voice "Neill" from the user U as wording for the text 1. When the control circuit 130 determines that a voice of the wording for the text 1 is obtained from the user U (S70: Yes), this flow goes to S90. When the control circuit 130 determines that a voice of the wording for the text 1 is not obtained from the user U (S70: No), this flow goes to S80. Thus, the control circuit 130 at S70 executes the content accepting processing for accepting the content of the obtained text 1 to be assigned to the object R1, by voice via the voice input device 135.

The control circuit 130 at S80 determines whether the time measured by the timer 134 from the start of the processing at S60 has reached a particular length of time (e.g., five seconds), for example. When the control circuit 130 determines that the time measured by the timer 134 has reached the particular length of time (S80: Yes), this flow goes to S90. When the control circuit 130 determines that the time measured by the timer 134 has not reached the particular length of time (S80: No), the control circuit 130 repeats this processing. In this processing at S80, the control circuit 130 may determine whether the time measured by the timer 134 from the inquiry has reached the particular length of time (e.g., five seconds) and may determine whether the time measured by the timer 134 from the voice input has reached the particular length of time (e.g., three seconds).

The control circuit 130 at S90 determines the text 1 by executing the voice-recognition processing for recognizing the voice "Neill" in the well-known voice-recognition method using the voice converter 139 as the wording for the text 1 obtained by the voice input device 135, and this flow goes to S100.

In the processing at S90, the control circuit 130 determines the text 1 in the case where "Neill" is present at a predetermined field corresponding to the text 1 in the database DB stored in the database device 140. Thus, in the case where "Neill" is absent at the predetermined field corresponding to the text 1 in the database device 140, the control circuit 130 may determine that "Neill" does not exist or that the voice is not appropriately converted, control the voice output device 138 to make an error notification, for example, and return the flow to S60. Thus, the processing at S90 may be a determination routine executed by the control circuit 130.

The control circuit 130 at S100 controls the voice output device 138 to make a voice "When is your birth date?" as wording for inquiry about the text 2 to be inserted into the object R2 of the template T2, and this flow goes to S110. That is, the control circuit 130 at S100 executes the content-inquiry processing for making an inquiry by voice via the voice output device 138 about the contents of the characters to be assigned to the object R2 of the objects R1, R2 of the particular template T2 for which designation is accepted.

The control circuit 130 at S110 determines whether the voice input device 135 has obtained a voice "Jan. 2, 1993" from the user U as wording for the text 2. When the control circuit 130 determines that a voice of the wording for the text 2 is obtained from the user U (S110: Yes), this flow goes to S130. When the control circuit 130 determines that a voice of the wording for the text 2 is not obtained from the user U (S110: No), this flow goes to S120. Thus, the control circuit 130 at S110 executes the content accepting processing for accepting the content of the obtained text 2 to be assigned to the object R2, by voice via the voice input device 135.

The control circuit 130 at S120 determines whether the time measured by the timer 134 from the start of the processing at S100 has reached a particular length of time (e.g., five seconds), for example. When the control circuit 130 determines that the time measured by the timer 134 has reached the particular length of time (S120: Yes), this flow goes to S130. When the control circuit 130 determines that the time measured by the timer 134 has not reached the particular length of time (S120: No), the control circuit 130 repeats this processing. In this processing at S120, the control circuit 130 may determine whether the time measured by the timer 134 from the inquiry has reached the particular length of time (e.g., five seconds) and may determine whether the time measured by the timer 134 from the voice input has reached the particular length of time (e.g., three seconds).

The control circuit 130 at S130 determines the text 2 by executing the voice-recognition processing for recognizing the voice "Jan. 2, 1993" in the well-known voice-recognition method using the voice converter 139 as the wording for the text 2 obtained by the voice input device 135, and this flow goes to S200.

In the processing at S130, the control circuit 130 determines the text 2 in the case where "Jan. 2, 1993" is present at a predetermined field corresponding to the text 2 in the database DB stored in the database device 140. Thus, in the case where "Jan. 2, 1993" is absent at the predetermined field corresponding to the text 2 in the database device 140, the control circuit 130 may determine that "Jan. 2, 1993" does not exist or that the voice is not appropriately converted, control the voice output device 138 to make an error notification, for example, and return the flow to S100. Thus, the processing at S130 may be a determination routine executed by the control circuit 130. The control circuit 130 automatically starts the print processing at S200 at the end of the processing at S130 or when the time measured by the timer 134 from the end of the processing at S130 has reached a particular length of time (e.g., two seconds).

The control circuit 130 at S200 assigns the texts 1, 2 to the respective objects R1, R2 of the template T2 in the predetermined form (e.g., a font type and a font size) and executes the print processing, and this flow ends. Thus, the control circuit 130 at S200 executes the printed-material creating processing for performing printing on the tape 11 to create the printed label L by controlling the platen-roller driving circuit 131 for the platen roller 106 and the printing driving circuit 132 for the thermal head 108 based on print data in which text data created by character recognition of the voice of the accepted contents of the texts 1, 2 are assigned to the respective objects R1, R2.

Figure 6:
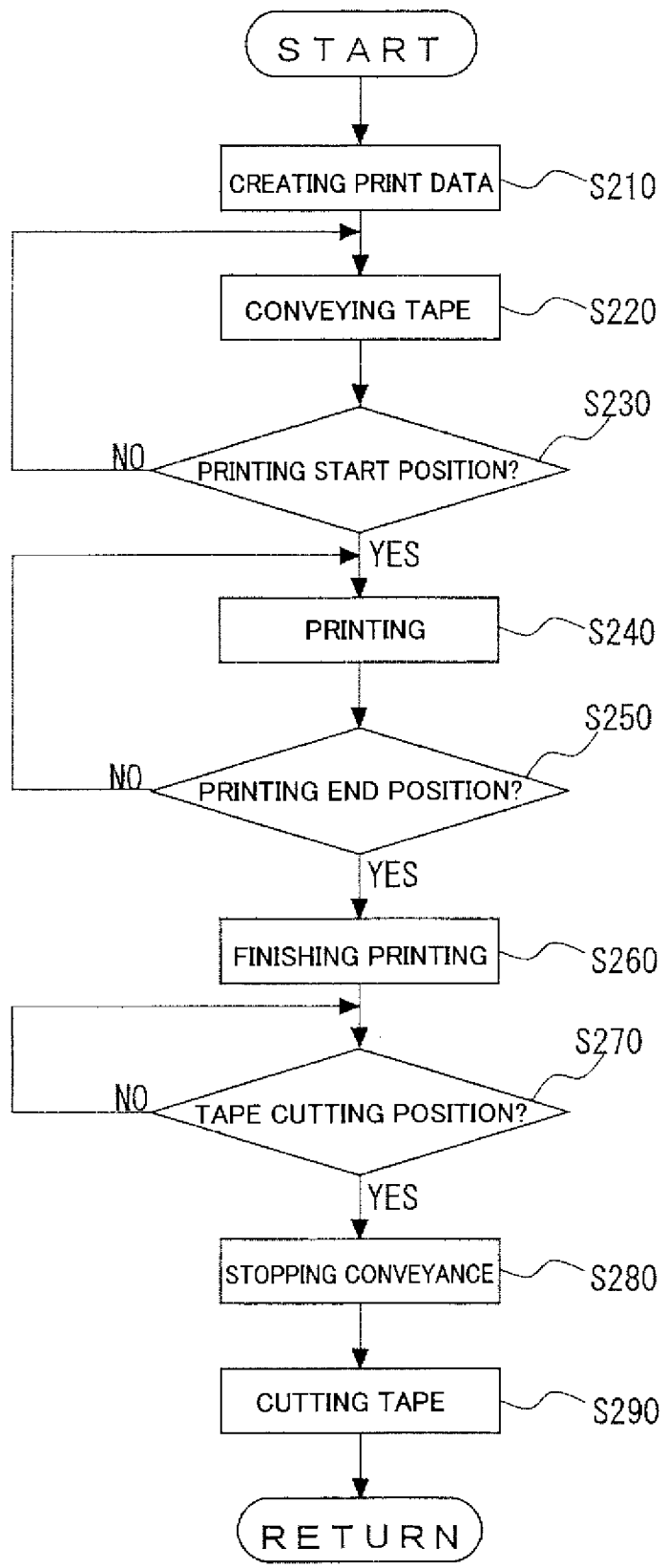
FIG. 6 is a flow representing a procedure of a print processing executed by the control circuit.

There will be next described, with reference to FIG. 6, a detailed procedure of the print processing at S200 executed by the control circuit 130.

The control circuit 130 at S210 assigns the texts 1, 2 to the respective objects R1, R2 of the template T2 in the predetermined form (e.g., the font type and the font size) to create print data, and this flow goes to S220.

The control circuit 130 at S220 controls the platen-roller driving circuit 131 to output a control signal to drive the platen-roller motor 107, causing the platen roller 106 to start conveying the tape 11, and this flow goes to S220.

The control circuit 130 at S230 determines in a well-known technique whether the tape 11 has reached a predetermined printing start position in the tape conveying direction. When the control circuit 130 determines that the tape 11 has not reached the printing start position (S230: NO), this flow returns to S220. When the tape 11 has reached the printing start position (S230: YES), this flow goes to S240.

The control circuit 130 at S240 outputs a control signal to the printing driving circuit 132 to energize the heating elements of the thermal head 108 based on the dot-pattern data to start printing on the tape 11 based on the print data, and this flow goes to S250.

The control circuit 130 at S250 determines in a well-known technique whether the tape 11 has reached a predetermined printing end position in the tape conveying direction. When the control circuit 130 determines that the tape 11 has not reached the printing end position (S250: NO), the control circuit 130 continues printing based on the print data. When the tape 11 has reached the printing end position (S250: YES), this flow goes to S260.

The control circuit 130 at S260 outputs a control signal to the printing driving circuit 132 to control the thermal head 108 to finish printing on the tape 11, and this flow goes to S260.

The control circuit 130 at S270 determines in a well-known technique whether the tape 11 has reached a tape cutting position in the tape conveying direction. When the control circuit 130 determines that the tape 11 has not reached the tape cutting position (S270: NO), the control circuit 130 continues conveyance of the tape 11. When the tape 11 has reached the tape cutting position (S270: YES), this flow goes to S280.

The control circuit 130 at S280 outputs a control signal to the platen-roller driving circuit 131 to stop driving of the platen-roller motor 107, causing the platen roller 106 to stop conveying the tape 11, and this flow goes to S290.

The control circuit 130 at S290 outputs a control signal to the cutter unit 109 to cut the printed tape 11 to create the printed label L with the printed texts 1, 2 thereon, and this flow ends.

Thus, the printing apparatus 100 creates the printed label L using the template T. That is, the plurality of templates T are stored in the template memory 133, and the objects R1, R2 are assigned to desired positions on each of the templates T. The printing apparatus 100 then creates print data by assigning the contents (the characters) desired by the user U, to each of the objects R1, R2 of the particular template T designated by the user U. The platen roller 106 and the thermal head 108 are controlled based on this print data to create the printed label L desired by the user U.

In the above-described process, the user U can input information by voice into the printing apparatus 100. That is, the user U designates the particular template T by voice, and the printing apparatus 100 accepts the voice via the voice input device 135 (the designation accepting processing). The printing apparatus 100 thereafter controls the voice output device 138 to make an inquiry by voice about contents of characters to be inserted into each of the objects R1, R2 of the particular template T (the content-inquiry processing). When the user U says the contents of the characters as an answer to the inquiry, the printing apparatus 100 accepts the voice via the voice input device 135 (the content accepting processing). A character-recognition device provided inside or outside the printing apparatus 100 performs character recognition for the voice representing the accepted contents of the characters, to create the text data or the mark data and create print data in which the text data or the mark data are assigned to the respective objects R1, R2. The platen roller 106 and the thermal head 108 are controlled based on this print data to create the printed label L desired by the user U (the printed-material creating processing).

Thus, the user U only needs to input the texts 1, 2 into the printing apparatus 100 by voice in response to the inquiry from the printing apparatus 100, to cause the printing apparatus 100 to create the printed label L by executing the template printing in a desired manner. Accordingly, when compared with the conventional technique that requires complicated operations on an operation terminal connected to the printing apparatus 100 not including operation interfaces such as a keyboard and the remote controller 120, it is possible to improve the convenience to the user U with reduced operations.

Here, the printing apparatus 100 determines the contents of the text 1 or 2 when the particular length of time (e.g., five seconds) has elapsed in the content accepting processing at S70 (see the middle portion of FIG. 4) and S110 (see the lower portion of FIG. 4), or when the particular length of time (e.g., three seconds) has elapsed after the contents of the text 1 or 2 to be assigned to the object R1 or R2 are accepted. Thus, when the user U inputs the contents of the texts 1, 2 into the respective objects R1, R2 by voice, the contents are automatically determined when the particular length of time has elapsed from the start or the end of the voice input. This eliminates the need of operations for determining the contents (such as an operation of the operation interface for transmitting an end command) and additional voice inputs, thereby eliminating unnecessary operations of the user U to further improve the convenience to the user U.

When the contents of all the texts 1, 2 to be assigned to the respective objects R1, R2 are determined in the content accepting processing, the printed-material creating processing is started.

Thus, as in the automatic determination of the input, in the case where voice input of the contents of the texts 1, 2 into the objects R1, R2 is completed by the user U, when the particular length of time has elapsed from the completion of the input into all the objects R1, R2, creation of the printed label L is started automatically. This eliminates the need of operations for starting creation of the printed label L (such as an operation of the operation interface for transmitting the end command) and additional voice inputs after the input, thereby eliminating unnecessary operations of the user U to further improve the convenience to the user U.

In the content-inquiry processing at S60 (see the middle portion of FIG. 4) and S100 (see the lower portion of FIG. 4), the voices "What's your name?" and "When is your birth date?" corresponding respectively to the text names assigned to the respective objects R1, R2 in advance are sequentially made via the voice output device 138 to make inquiries about the contents of the texts 1, 2 to be assigned to the respective objects R1, R2.

Thus, when the printing apparatus 100 makes an inquiry to the user U to prompt input of the characters into the objects R1, R2, the printing apparatus 100 uses the text names assigned to the respective objects R1, R2 (by referring to the database DB). This configuration enables the user U to reliably recognize which of the objects R1, R2 the user is requested to make a voice for.

While the embodiment has been described above, it is to be understood that the disclosure is not limited to the details of the illustrated embodiment, but may be embodied with various changes and modifications, which may occur to those skilled in the art, without departing from the spirit and scope of the disclosure.

For example, while the above-described embodiment is explained assuming that the user U knows the wording for calling the desired template T2 ("Name list, No. 12"), there may be a case where the user U does not know the wording for calling the desired template T2 and a case where the user U does not know what type of templates are prepared.

To solve this problem, in the case where the user says "Template Type" at S10 instead of "Template Printing", for example, the printing apparatus 100 may execute a processing for making a notification about the type of the template before executing the processing at S30.

Figure 7:
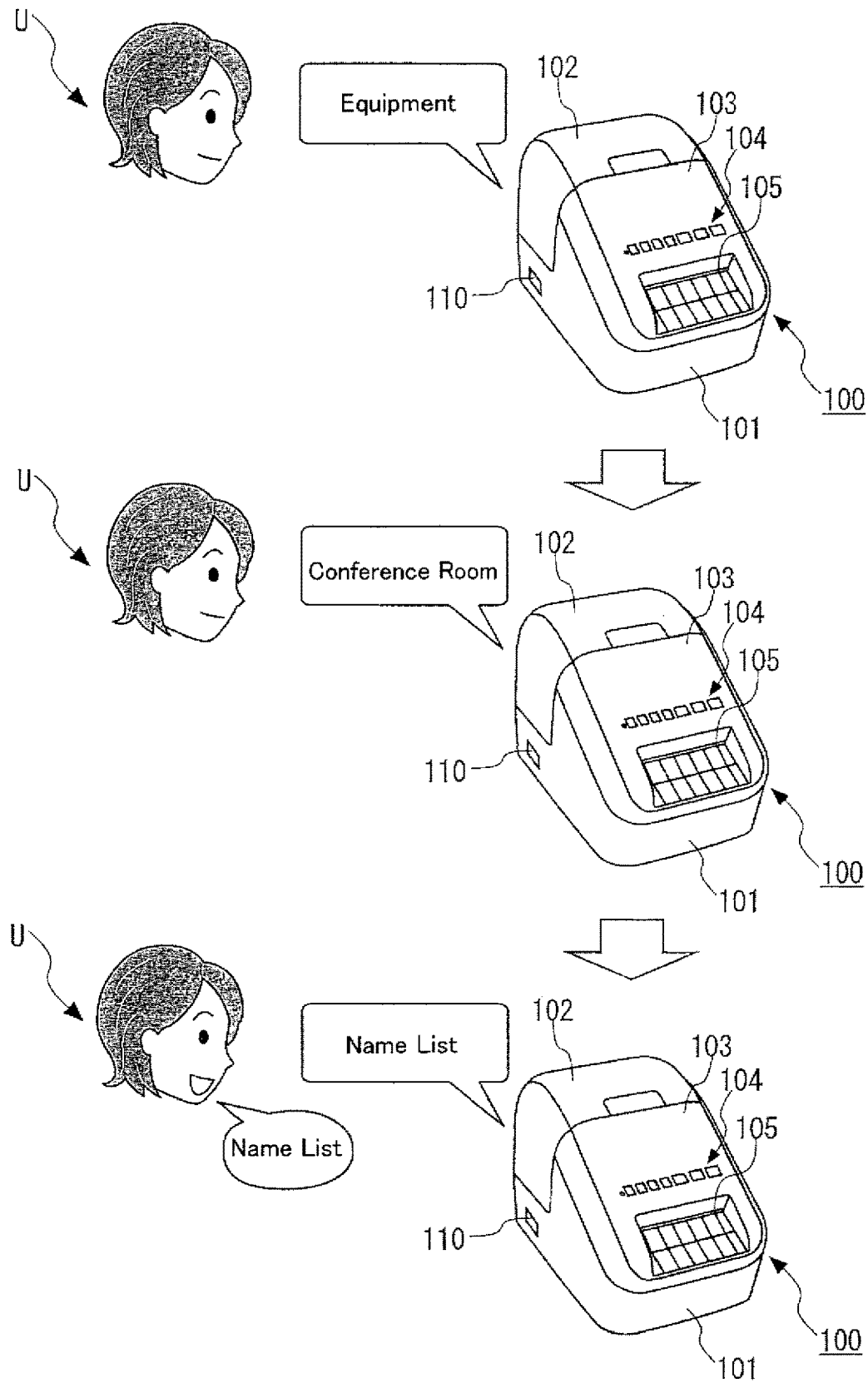
FIG. 7 is a view for conceptually explaining another example of operations sequentially performed by the printing apparatus and the user.

Specifically, as illustrated in FIG. 7, in the case where data relating to the templates T stored in the template memory 133 include a plurality of templates assigned with "Equipment", "Conference Room", "Name List", and so on as a large group, the control circuit 130 controls the voice output device 138 to sequentially call the names of the large group. When one of the output names corresponds to a template desired by the user, the user says the same name of the large group ("Name List" in FIG. 7). The control circuit 130 then controls the voice output device 138 to sequentially call the names of templates relating to the name list as a small group, i.e., the names of the templates T1, T2, T3. This enables the user to use the desired template (e.g., the template T2) as in the case of the large group. It is noted that when the template T to be used is determined, the processing at S30 and the subsequent processings are executed as in the above-described embodiment.

Thus, the control circuit 130 executes a name reading processing (FIG. 7) for controlling the voice output device 138 to subsequently read all the names of the templates T stored in the template memory 133 aloud. In the case where the user says the name of a particular template T2 when the name is output from the voice output device 138 by voice, the control circuit 130 executes a designation accepting processing for accepting the designation of the particular template T2 by replacing the designation with an input "Name list, No. 12".

With this configuration, even in the case where the user U accidentally forgets the name of the template T2 to be used, the user can reliably designate the template T2 by inputting the name of the template T2 by voice after the name is read (called).

While the texts 1, 2 are determined at S90 and S130 in the above-described embodiment, database printing may be performed without these determinations, for example.

Figure 8:
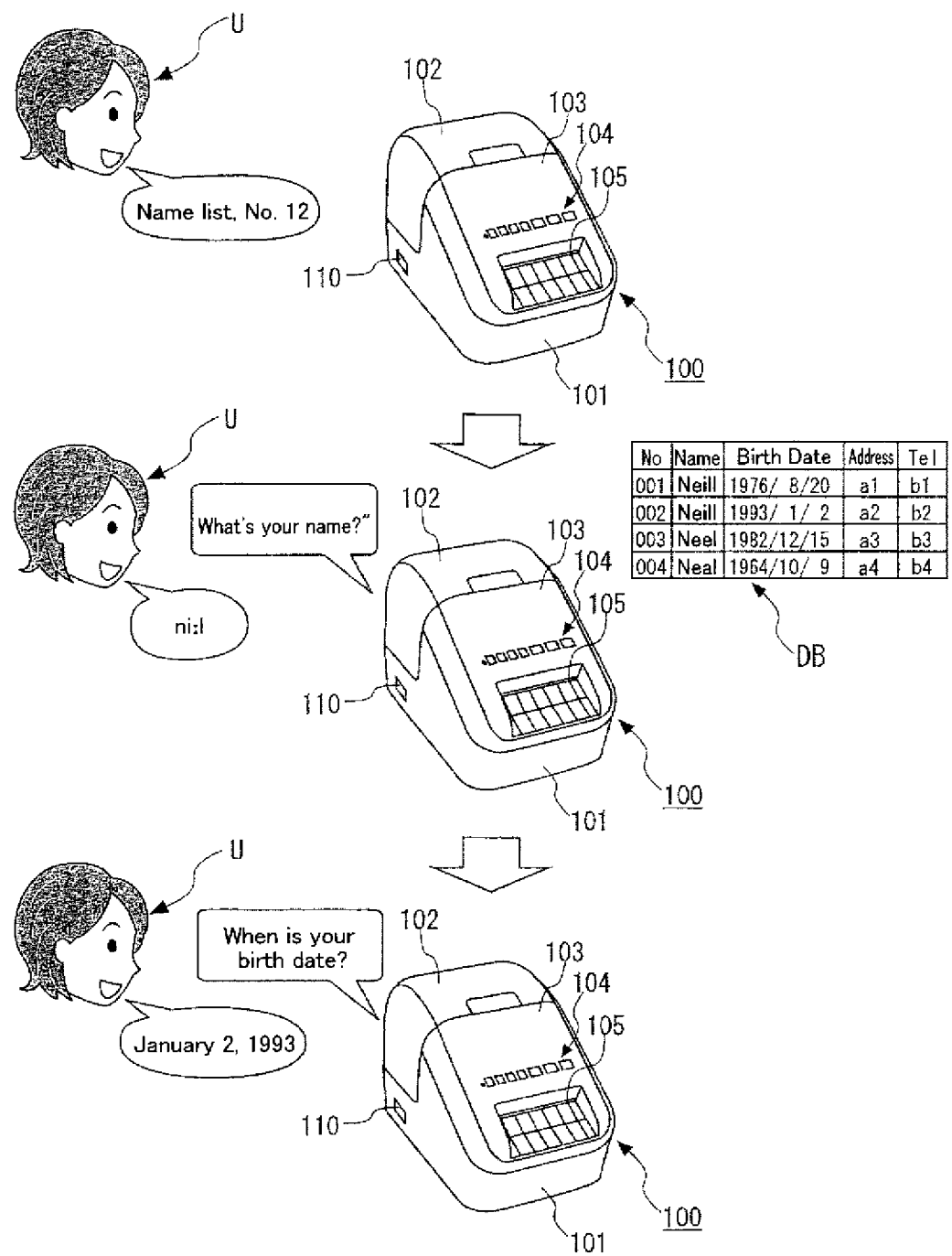
FIG. 8 is a view for conceptually explaining yet another example of operations sequentially performed by the printing apparatus and the user.

For example, the database device 140 stores a database DB illustrated in the middle portion of FIG. 8. The database DB stores four records assigned with the record numbers 001-004 and stores text data for each record in each of fields "Name", "Birth Date", "Address", "Tel", and so on.

In this database printing, the text 1 as the text name is not assigned to the object R1 for insertion of the name, and the text 2 as the text name is not assigned to the object R2 for insertion of the birth date unlike the above-described embodiment.

That is, the text data in the "Name" field of the database DB is automatically assigned to the object R1, and the text data in the "Birth Date" field of the database DB is automatically assigned to the object R2.

In the case of normal database printing, the print processing is executed in the order of the records 001-004 to create printed labels L. First, the name "Neill" in the record 001 is inserted into the object R1, and the birth date "Aug. 20, 1976" in the record 001 is inserted into the object R2 to create a printed label L printed with "Neill, Aug. 20, 1976".

Likewise, the name "Neill" in the record 002 is inserted into the object R1, and the birth date "Jan. 2, 1993" in the record 002 is inserted into the object R2 to create a printed label L printed with "Neill, Jan. 2, 1993". Printed labels L corresponding to the records 003, 004 are created in a similar manner.

In the present modification, in contrast, it is possible to create one print label L using a particular record instead of creating the four labels corresponding to all the records 001-004 stored in the database DB.

Specifically, the user U first designates the template T2 by saying "Name list, No. 12" as illustrated in the upper portion of FIG. 8. In response, the control circuit 130 of the printing apparatus 100 reads the template T2 from the template memory 133 and then controls the voice output device 138 to output a voice "What's your name?" to make an inquiry as illustrated in the middle portion of FIG. 8.

In response, the user U says "ni:1" in order to specify the record in the database DB. Here, in the case where there is only one record having a name called "ni:1", i.e., the record having the name "Neill", as in the database DB illustrated in FIG. 4, the control circuit 130 specifies the record (as one example of a first record) having the name "Neill" and creates print data corresponding to the record containing the corresponding birth date to execute the print processing. That is, the control circuit 130 in the content-inquiry processing makes an inquiry about "Name" as one of the fields, and in the case where the record having a name called "ni:1" that is accepted by voice in the content accepting processing in response to the inquiry matches only the record having the name "Neill" among the plurality of records, the control circuit 130 in the content-inquiry processing cancels inquiries about the field(s) following "Name" such as "Birth Date" for the record having the name "Neill".

In the database DB illustrated in the middle portion of FIG. 8, for example, there are four names called "ni:1", making it impossible to specify the record.

To solve this problem, in the case where there are a plurality of records 001-004 each having a name called "ni:1", as illustrated in the lower portion of FIG. 8, the control circuit 130 makes an inquiry "When is your birth date?", receives an answer "Jan. 2, 1993" from the user U, and specifies the record 002. That is, the control circuit 130 in the content-inquiry processing makes an inquiry about "Name" as one of the fields, and in the case where the record having a name called "ni:1" that is accepted by voice in the content accepting processing in response to the inquiry matches the records 001-004 and does not match the record 002 (as another example of the first record) having the name "Neill" among the plurality of records, the control circuit 130 in the content-inquiry processing continues inquiring about the field(s) following "Name" such as "Birth Date" for the record 002.

With this configuration, the control circuit 130 reads data in the fields "Name" and "Birth Date" at the time when the records 001-004 are specified, to create a printed label L printed with "Neill, Jan. 2, 1993". It is possible to omit the processings at S90 and S130 and omit the processings after the second inquiry (the processings at S100-S130) in the case where a record is specified by the first inquiry. It is noted that, in the case where there is at least one field in which data are different from each other in the database DB regardless of whether the field is used for printing, for example, it is possible to omit the processings after the second inquiry (the processings at S100-S130) by using the field for an inquiry.

As described above, the printing apparatus 100 using the database printing further includes the database device 140 storing the database DB including the records 001-004 each containing characters for each field. The template memory 133 stores the template T having the objects R1, R2, to each of which characters associated with a corresponding one of the fields ("Name", "Birth Date", "Address", "Tel", and so on) are assigned in each of the records 001-004 stored in the database DB. In the content-inquiry processing (S60, S100), the voice output device 138 is controlled to subsequently call the names of the respective fields to make an inquiry about the contents of the characters to be assigned to each of the objects R1, R2 corresponding to the respective fields.

The characters are associated with the fields in each of the records 001-004 contained in the database DB stored in the database device 140. The contents of the characters associated with each of the fields in the records are assigned to a corresponding one of the objects R1, R2 in creation of each of the printed labels L to subsequently create the printed labels L with the contents corresponding to the respective records 001-004.

Thus, when the printing apparatus 100 makes an inquiry to prompt input of the characters into the objects R1, R2 in the content-inquiry processing (S60, S100) in creation of the printed label L, the printing apparatus 100 uses the names in the fields corresponding to the respective objects R1, R2. This configuration enables the user U to reliably recognize which of the objects R1, R2 the user is requested to make a voice for.

When the contents of the characters accepted by voice in the content accepting processing in response to an inquiry about at least one field match the contents in the at least one field in any of the records 001-004, the control circuit 130 in the content-inquiry processing (S60, S100) cancels inquiries about the field(s) following the at least one field.

That is, in the case where the contents of the characters associated with the "Name" field are different from each other among the records 001-004 in the database DB, for example, the control circuit 130 can specify which record the user U wants to insert into the printed label L among the records 001-004, when the contents of the characters for one field are designated by the user U. This eliminates the need for the user U to designate the contents of the characters for the second and subsequent fields (e.g., "Birth Date"). Even in the case where the control circuit 130 cannot specify the record only by designation of one field, for example, designation of some fields may eliminate the need of designation of the following fields.

To deal with this case, in the case where the contents of the characters accepted from the user U by voice in at least one field match the contents associated with at least one field in any record, the control circuit 130 cancels inquiries about the field(s) following the field. With this configuration, the user U only has to answer a minimum number of inquiries by voice, thereby reliably reducing a burden on the user U.

There may be a difference in security level of, e.g., confidentiality and personal information depending upon the contents of the texts 1, 2 to be inserted into the respective objects R1, R2 to create the printed label L. Increase in information stored in the database DB increases a possibility that reading is the same in a certain field (e.g., the name), that is, reading of the user U is the same in a certain field. Examples of this case include a case where the database DB has a multiplicity of fields in one record, which case includes a case where a certain text is not handled as a text to be inserted into the objects R1, R2 of the template T2 but is handled as a text to be inserted into another object of the template T.

Thus, the case where the security level is high, the case where data are the same in reading and spelling in a particular field (e.g., "Name"), or the case where data are the same in reading but different in spelling, for example, it is possible to use a field that is not used for the texts 1, 2 to be inserted into the respective objects R1, R2.

Figure 9:
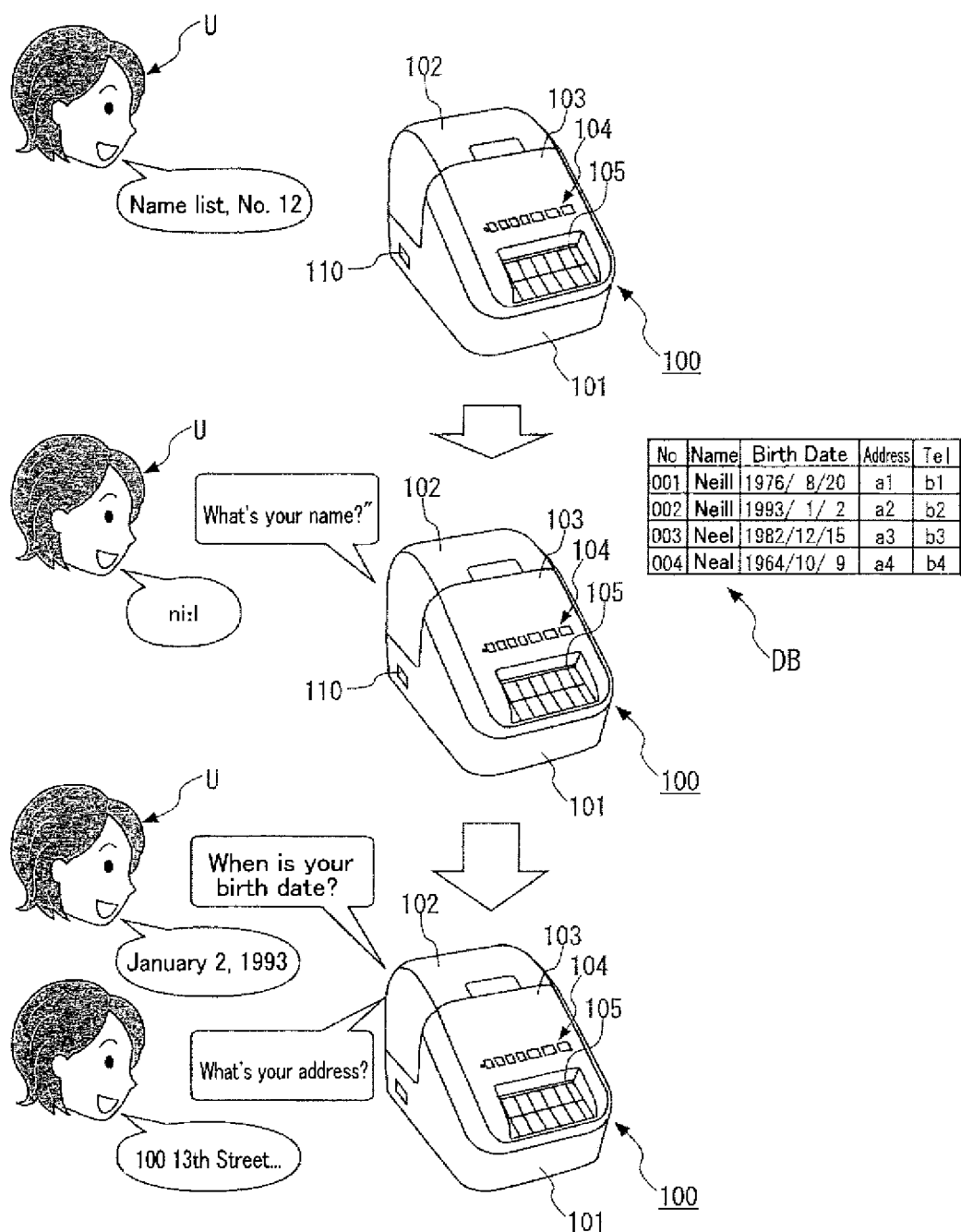
FIG. 9 is a view for conceptually explaining yet another example of operations sequentially performed by the printing apparatus and the user.

Specifically, the printing apparatus 11 may be configured such that, in the case where the security level is high, the control circuit 130 executes a processing, following the processing at S130, in which as illustrated in the lower portion of FIG. 9 the printing apparatus 100 makes an inquiry such as "What is your address?" and "What is your telephone number?" to request an answer about the contents of a field not used for the objects R1, R2 in the same record contained in the database DB, and in the case where the answer of the user U is correct, the control circuit 130 executes the print processing at S200. That is, the number of the fields (four) is greater than the number of the objects (two) in the database DB illustrated in FIG. 9, and the control circuit 130 in the content-inquiry processing makes an inquiry about at least one field not corresponding to the objects (i.e., at least one of "Address" and "Tel") by voice in addition to making an inquiry by voice about the contents of the objects (R1, R2). Also, in FIG. 9, the control circuit 130 in the content-inquiry processing makes an inquiry about "Birth Date", and even in the case where the contents accepted in the content accepting processing by voice in response to the inquiry matches only those in the record 002 (as yet another example of the first record), the control circuit 130 continues making inquiries about at least one field following "Birth Date" (i.e., at least one of "Address" and "Tel") in the record 002.

Likewise, in the case where there is a field in which data are the same in reading and are the same or different in spelling as in the database DB illustrated in the middle portion of FIG. 9, the control circuit 130 at S70 determines whether the contents of characters input by the user match those in the database DB, does not determine the text 1, and executes the processing at S100. In the case where the record cannot be specified as a result of the processing at S100, as illustrated in the lower portion of FIG. 9, the printing apparatus 100 makes an inquiry such as "What is your address?" and "What is your telephone number?" to request an answer about the contents of a field not used for the objects R1, R2 in the same record contained in the database DB, and the control circuit 130 specifies the record based on the answer from the user U, then determines the texts 1, 2, and then executes the print processing at S200.

Thus, in the content-inquiry processing, in the case where a security level assigned to each of the records (corresponding to the records 001-004 in FIG. 9) in the database DB is low, the printing apparatus 100 cancels an inquiry when the contents of characters input by the user match those in each of a relatively small number of fields, and in the case where the security level assigned to each of the records is high, the printing apparatus 100 cancels an inquiry when the contents of characters input by the user match those in each of a relatively large number of fields. Specifically, for example, in the case where the security level assigned to the record 002 (as yet another example of the first record) is lower than that assigned to the record 003 (one example of a second record) in the database DB illustrated in FIG. 9, the control circuit 130 in the content-inquiry processing makes inquiries about two (as one example of a first number) fields ("Name" and "Birth Date") for the record 002 and then determines whether the contents accepted in the content accepting processing match those in the record 002. The control circuit 130 in the content-inquiry processing makes inquiries about three (as one example of a second number) fields ("Name", "Birth Date", and "Address") for the record 003 and then determines whether the contents accepted in the content accepting processing match those in the record 003. In the case where the contents of characters input by the user match those in each of the two fields in the record 002, the control circuit 130 cancels the inquiry in the content-inquiry processing. In the case where the contents of characters input by the user match those in each of the three fields in the record 003, the control circuit 130 cancels the inquiry in the content-inquiry processing.

With this configuration, for example, in printing with a low security level, a higher priority is given to reduction of a burden on the user by canceling an inquiry early. In printing with a high security level, matching of the contents of information input by voice and the contents of the record is carefully checked to achieve high confidentiality. It is noted that the security level may be set for each record as described above and may be set uniformly for all the records in the database.

In the case where there are a plurality of records with the same reading in one field (e.g., "Name"), and a record desired by the user cannot be specified by one inquiry, when the control circuit 130 uses information stored in another field in the database DB and determines that the contents of characters input by the user match those in each of at least two fields in the database DB, for example, the control circuit 130 specifies the record and determines the texts 1, 2 to be inserted into the respective objects R1, R2 of the record. This prevents confusion and reduces the number of the printed labels L to be created, when compared with the case where this problem is solved by creating a plurality of printed labels L of different types.

It is noted that the tape roll 10 that is a roll of the tape 11 having the predetermined width is contained in the cartridge that is removably mountable to the body housing 101 in the above-described embodiment, but the present disclosure is not limited to this configuration. For example, the tape roll 10 may be directly contained in the body housing 101 and rotated in the body housing 101 to draw the tape 11.

In the above-described embodiment, the tape 11 is constituted by (i) the elongated heat-sensitive sheet (the thermal paper sheet) that develops color when heated and (ii) the separating sheet bonded to one of the opposite surfaces of the heat-sensitive sheet with adhesive, but the present disclosure is not limited to this configuration. For example, the tape 11 may be of any of (i) a type in which printing is performed on a cover film different from a substrate tape, and the substrate tape and the cover film are stuck to each other and (ii) a type in which printing is performed on a printing layer of the substrate tape (sticking is not performed).

The tape roll 10 may be replaced with a tape or a sheet of an elongated flat shape or a strip shape. In this case, a feeder mechanism may supply the tapes or sheets one by one from the outside of the printing apparatus 100 to the inside of the printing apparatus 100.

Each arrow in FIG. 3 indicates one example of a flow of signals and does not limit a direction or directions of the flow of the signals.

Processings achieved by the present disclosure are not limited to the flowcharts illustrated in FIGS. 5 and 6. The processings may be added, removed, altered, combined, and reordered without departing from the spirit of the scope of the present disclosure. For example, the above-described flow may be configured such that the processings at S10 and S20 are omitted, and an application is started to establish a standby state for the processing at S30 at the time when the main power switch is turned on, and initialization is performed. In the above-described modification, the number (four) of the fields is greater than the number (two) of the objects in the database DB illustrated in FIG. 8, and an inquiry is made in the content-inquiry processing by voice about the contents of the objects (R1, R2), but an inquiry may not be made about at least one field not corresponding to the objects (i.e., at least one of "Address" and "Tel") by voice.

The techniques in the above-described embodiment and modifications may be used in any combinations.

The disclosure is not limited to the details of the illustrated embodiment and modifications, but may be embodied with various changes and modifications, which may occur to those skilled in the art, without departing from the spirit and scope of the disclosure.

What is claimed is:

1. A printing apparatus, comprising:
   a conveyor configured to convey a printing medium;
   a printing device configured to perform printing on the printing medium conveyed by the conveyor;
   a first storage configured to store (i) a first template in which a first objet is disposed at a first position on the printing medium, and a second objet is disposed at a second position on the printing medium, and (ii) a second template in which the first objet is disposed at a third position on the printing medium, and the second objet is disposed at a fourth position on the printing medium;
   a voice input device configured to input a voice;
   an output device configured to output information; and
   a controller configured to execute:

a designation accepting processing in which the controller accepts designation of a particular template, which is one of the first template and the second template, by voice via the voice input device;

a content-inquiry processing in which the controller makes an inquiry via the output device about contents of at least one first particular character to be assigned to the first object and at least one second particular character to be assigned to the second object contained in the particular template for which the designation is accepted;

a content accepting processing in which the controller accepts the contents of the assigned at least one first particular character and the assigned at least one second particular character in response to the inquiry, by voice via the voice input device; and a printed-material creating processing in which the controller creates print data for the first object and the second object respectively based on first character data and second character data created by character recognition of the voice indicating the accepted contents of the at least one first particular character and the at least one second particular character and controls the conveyor and the printing device to perform printing on the printing medium based on the created print data to create a printed material.

2. The printing apparatus according to claim 1,
wherein the output device is a voice output device configured to output a voice, and
wherein the controller is configured to, in the content-inquiry processing, make an inquiry by voice via the voice output device about the contents of the assigned at least one first particular character and the assigned at least one second particular character.

3. The printing apparatus according to claim 1, wherein the controller is configured to, in the content accepting processing, determine one of the contents of the at least one first particular character to be assigned to the first object and the at least one second particular character to be assigned to the second object, when a particular length of time has elapsed after the one of the contents of the at least one first particular character to be assigned to the first object and the at least one second particular character to be assigned to the second object is accepted.

4. The printing apparatus according to claim 3, wherein the controller is configured to start the printed-material creating processing when the contents of the at least one first particular character to be assigned to the first object and the at least one second particular character to be assigned to the second object are determined in the content accepting processing.

5. The printing apparatus according to claim 1,
wherein the controller is configured to execute a name reading processing in which the controller controls the output device to sequentially output names of the first template and the second template stored in the first storage aloud, and
wherein the controller is configured to, in the designation accepting processing, accept the designation of the particular template which is input by voice via the voice input device, when a name of the particular template is read.

6. The printing apparatus according to claim 1, wherein the controller is configured to, in the content-inquiry processing, control the output device to sequentially output a first text name of the first object and a second text name of the second object to make inquiry about the contents of the at least one first particular character to be assigned to the first object and the at least one second particular character to be assigned to the second object.

7. The printing apparatus according to claim 1, further comprising a second storage configured to store a database comprising:

a first record in which at least one first field character is associated with a first field, and at least one second field character is associated with a second field; and a second record in which at least one third field character is associated with the first field, and at least one fourth field character is associated with the second field, wherein the first storage is configured to store:
the first template in which the first field is associated with the first object, and the second field is associated with the second object; and
the second template in which the first field is associated with the first object, and the second field is associated with the second object, and wherein the controller is configured to, in the content-inquiry processing, control the output device to sequentially a first field name of the first field and a second field name of the second field to make an inquiry about (i) a content of the at least one first particular character assigned to the first object associated with the first field and (ii) a content of the at least one second particular character assigned to the second object associated with the second field.

8. The printing apparatus according to claim 7,
wherein the database comprises a third field,
wherein at least one fifth field character is associated with the third field in the first record,
wherein at least one sixth field character is associated with the third field in the second record, and
wherein the controller is configured to, in the content-inquiry processing, make an inquiry about contents of the first object and the second object and does not make an inquiry about a content of the third field not corresponding to the first object and the second object.

9. The printing apparatus according to claim 7,
wherein the database comprises a third field,
wherein at least one fifth field character is associated with the third field in the first record,
wherein at least one sixth field character is associated with the third field in the second record, and
wherein the controller is configured to, in the content-inquiry processing, make an inquiry about a content of the third field not corresponding to the first object and the second object in addition to making an inquiry about contents of the first object and the second object.

10. The printing apparatus according to claim 7,
wherein the controller is configured to make an inquiry about the first field in the content-inquiry processing, and
wherein the controller is configured to, when the content of the at least one first particular character which is accepted by voice in the content accepting processing in response to the inquiry matches a content only in the first record, cancel an inquiry to the first record about at least one field in the content-inquiry processing, the at least one field following the first field in which the content accepted in the content accepting processing matches the content in the first record.

11. The printing apparatus according to claim 7,
wherein the controller is configured to make an inquiry about the first field in the content-inquiry processing, and wherein the controller is configured to, when the content of the at least one first particular character which is accepted by voice in the content accepting processing in response to the inquiry does not match a content only in the first record, continue an inquiry to the first record about at least one field in the content-inquiry processing, the at least one field following the first field in which the content accepted in the content accepting processing matches the content in the first record.

12. The printing apparatus according to claim 7,
wherein the controller is configured to make an inquiry about the first field in the content-inquiry processing, and
wherein the controller is configured to, even when the content of the at least one first particular character which is accepted by voice in the content accepting processing in response to the inquiry matches a content only in the first record, continue an inquiry to the first record about at least one field in the content-inquiry processing, the at least one field following the first field in which the content accepted in the content accepting processing matches the content in the first record.

13. The printing apparatus according to claim 7,
wherein the database comprises a third field,
wherein at least one fifth field character is associated with the third field in the first record,
wherein at least one sixth field character is associated with the third field in the second record, and
wherein the controller is configured to, when a first security level assigned to the first record is lower than a second security level assigned to the second record different from the first record;
  for the first record, make an inquiry about the first field and the second field in the content-inquiry processing and determine whether the content of the at least one first particular character which is accepted in the content accepting processing matches a content of the at least one first field character which is associated with the first field in the first record and whether the content of the at least one second particular character which is accepted in the content accepting processing matches a content of the at least one second field character which is associated with the second field in the first record; and
  for the second record, make an inquiry about the first field, the second field, and the third field in the content-inquiry processing and determine whether the content of the at least one first particular character which is accepted in the content accepting processing matches the content of the at least one third field character which is associated with the first field in the second record, whether the content of the at least one second particular character which is accepted in the content accepting processing matches the content of the at least one fourth field character which is associated with the second field in the second record, and whether a content of at least one third particular character which is accepted in the content accepting processing matches a content of the at least one sixth field character which is associated with the third field in the second record.

14. The printing apparatus according to claim 13, wherein the controller is configured to cancel the inquiry when the controller determines that the content of the at least one first particular character matches the content of the at least one first field character which is associated with the first field in the first record, and the content of the at least one second particular character matches the content of the at least one second field character which is associated with the second field in the first record or when the content of the at least one first particular character matches the content of the at least one third field character which is associated with the first field in the second record, the content of the at least one second particular character matches the content of the at least one fourth field character which is associated with the second field in the second record, and the content of the at least one third particular character matches the content of the at least one sixth field character which is associated with the third field in the second record.

* * * * *